United States Patent
Smith et al.

(10) Patent No.: US 9,222,815 B2
(45) Date of Patent: Dec. 29, 2015

(54) WAFER STYLE INSERTABLE MAGNETIC FLOWMETER WITH COLLAPSIBLE PETALS

(71) Applicant: Rosemount Inc., Chanhassen, MN (US)

(72) Inventors: Joseph Alan Smith, Minneapolis, MN (US); Jeffrey Alan Cota, Rosemount, MN (US); Brian Scott Junk, Plymouth, MN (US); Steven Bruce Rogers, Minnetonka, MN (US)

(73) Assignee: Rosemount Inc., Chanhassen, MN (US)

(*) Notice: Subject to any disclaimer, the term of this patent is extended or adjusted under 35 U.S.C. 154(b) by 60 days.

(21) Appl. No.: 14/143,718

(22) Filed: Dec. 30, 2013

(65) Prior Publication Data

US 2015/0185057 A1    Jul. 2, 2015

(51) Int. Cl.
*G01F 1/58* (2006.01)
*G01F 1/60* (2006.01)
*G01F 15/18* (2006.01)

(52) U.S. Cl.
CPC .......... *G01F 1/588* (2013.01); *G01F 1/58* (2013.01); *G01F 1/60* (2013.01); *G01F 15/185* (2013.01)

(58) Field of Classification Search
CPC ............ G01F 1/58; G01F 1/588; G01F 1/584
USPC ....................................................... 73/861.12
See application file for complete search history.

(56) References Cited

U.S. PATENT DOCUMENTS

| | | |
|---|---|---|
| 3,745,824 A | 7/1973 | Mannherz et al. |
| 3,924,466 A | 12/1975 | Medlar |
| 3,981,190 A | 9/1976 | Vidmantas |
| 4,098,118 A | 7/1978 | Schmoock |
| 4,186,599 A | 2/1980 | Frick |
| 4,249,567 A * | 2/1981 | Weiss ............................ 137/512 |
| 4,253,340 A | 3/1981 | Schmoock |
| 4,459,858 A | 7/1984 | Marsh |
| 4,785,672 A | 11/1988 | Picone |
| 5,349,872 A | 9/1994 | Kalotay et al. |
| 5,637,802 A | 6/1997 | Frick et al. |

(Continued)

FOREIGN PATENT DOCUMENTS

| | | |
|---|---|---|
| DE | 1 026 978 | 3/1958 |
| DE | 3329689 | 3/1984 |

(Continued)

OTHER PUBLICATIONS

Notification of Transmittal of the International Search Report and the Written Opinion of the International Searching Authority from PCT/US2014/055774, dated Dec. 3, 2014.

(Continued)

*Primary Examiner* — Lisa Caputo
*Assistant Examiner* — Nathaniel T Woodward
(74) *Attorney, Agent, or Firm* — Westman, Champlin & Koehler, P.A.

(57) ABSTRACT

A magnetic flowmeter for measuring flow of a process fluid includes a meter body having an opening formed therein. The meter body is configured to be inserted in-line between process piping which carries the process fluid. A moveable extension is coupled to the meter body and configured to extend into the process piping. A coil of wire is carried by the extension and configured to generate a magnetic field. A pair of electrodes sense an EMF in the process fluid generated as a function of the applied magnetic field and flow of the process fluid.

30 Claims, 5 Drawing Sheets

(56) References Cited

U.S. PATENT DOCUMENTS

| | | |
|---|---|---|
| 5,659,132 A | 8/1997 | Novak et al. |
| 5,866,823 A * | 2/1999 | Scarpa ........................ 73/861.16 |
| 6,079,276 A | 6/2000 | Frick |
| 6,082,199 A | 7/2000 | Frick et al. |
| 6,089,097 A | 7/2000 | Frick et al. |
| 6,484,585 B1 | 11/2002 | Sittler et al. |
| 6,505,516 B1 | 1/2003 | Frick et al. |
| 6,508,129 B1 | 1/2003 | Sittler |
| 6,516,671 B2 | 2/2003 | Romo et al. |
| 6,520,020 B1 | 2/2003 | Lutz et al. |
| 6,561,038 B2 | 5/2003 | Gravel et al. |
| 6,725,731 B2 | 4/2004 | Wiklund et al. |
| 6,848,316 B2 | 2/2005 | Sittler et al. |
| 6,877,386 B2 | 4/2005 | Needham et al. |
| 7,096,738 B2 | 8/2006 | Schumacher |
| 7,559,244 B2 | 7/2009 | Hoimyr et al. |
| 7,621,188 B2 | 11/2009 | Lincoln et al. |
| 7,650,797 B2 | 1/2010 | Nielsen |
| 7,665,368 B2 | 2/2010 | Lincoln et al. |
| 7,673,523 B2 | 3/2010 | Nielsen |
| 7,930,816 B2 | 4/2011 | Lincoln et al. |
| 8,286,502 B2 | 10/2012 | Pelayo |
| 8,307,719 B2 | 11/2012 | Magliocca et al. |
| 8,561,480 B2 | 10/2013 | Lawrence |
| 2005/0189762 A1 | 9/2005 | Endres et al. |
| 2009/0188327 A1 | 7/2009 | Shanahan et al. |
| 2013/0305838 A1 | 11/2013 | Mikolichek et al. |
| 2014/0083199 A1 | 3/2014 | Rogers |
| 2014/0083200 A1 | 3/2014 | Rogers et al. |

FOREIGN PATENT DOCUMENTS

| | | | | |
|---|---|---|---|---|
| DE | 19708857 | | 7/1988 | |
| DE | 41 14 537 A1 | | 11/1992 | |
| DE | 102005030208 | * | 6/2005 | ................ G01F 1/58 |
| DE | 10 2005 060 208 A1 | | 6/2007 | |
| EP | 0 682 233 | | 11/1995 | |
| GB | 2403016 | | 12/2004 | |
| JP | 2013-007664 | | 1/2013 | |

OTHER PUBLICATIONS

Rubber Fab Technologies Group, "Rubber Fab Technologies Group's Smart Gasket® Improved Pharmaceutical in Line Systems Validation", New Jersey, 2001, 4 pages.

International Search Report and Written Opinion of the International Searching Authority dated May 16, 2013 for International Appl. No. PCT/US2012/068949.

Sitrans F M MAG 8000 / MAG 8000 CT/ MAG 8000 Irrigator; Water Flow Meter. Siemens. Retrieved Mar. 21, 2013 from www.automation.siemens.com/w1/index.aspx?nr=18644.

Sitrans F M MAG 5100 W. Overview. Siemens. Retrieved Mar. 21, 2013 from www.automation.siemens.com/w1/index.aspx?nr=18632.

Office Action from U.S. Appl. No. 13/630,600, dated May 21, 2014, 7 pages.

Notification of Transmittal of the International Search Report and the Written Opinion of the International Searching Authority from PCT/US2015/011129, dated Apr. 22, 2015.

\* cited by examiner

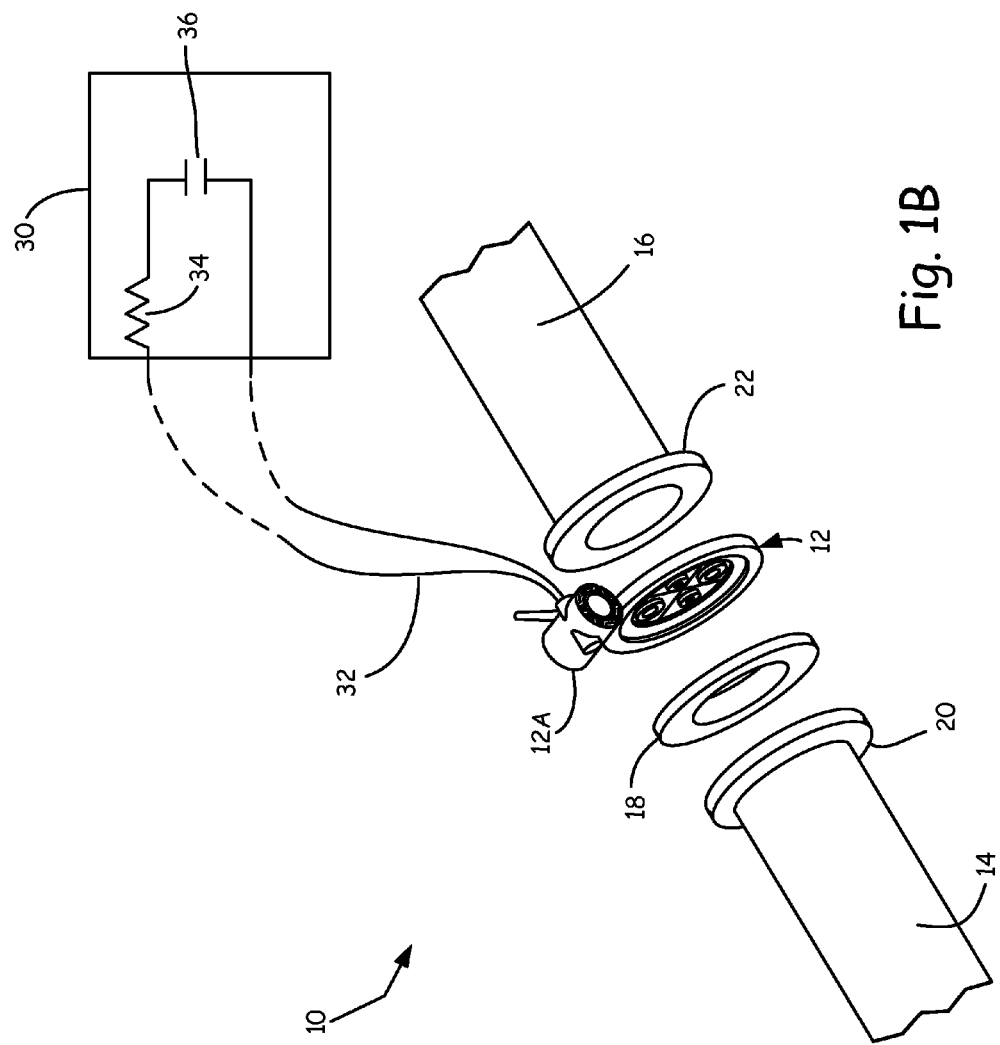

WAFER STYLE INSERTABLE MAGNETIC FLOWMETER WITH COLLAPSIBLE PETALS

BACKGROUND

The present invention relates to magnetic flowmeters that sense flow of process fluid in industrial process plants.

Typical prior art magnetic flowmeters utilize an electrically insulated flow tube which carries a process fluid past an electromagnet and electrodes. The electrodes are carried in the flow tube and make electrical contact with the flowing liquid. The electrodes sense an electromotive force (EMF) which is magnetically induced in the fluid. The sensed EMF is proportional to the applied magnetic field and the flow rate according to Faraday's Law of Electromagnetic Conduction.

The flow tube is typically carried in a large cylindrical body having flanged ends which is sometimes referred to as a "weldment." The flanged ends of the weldment are bolted to similar flanges carried on process piping such that the flow tube is aligned in series with the process piping and the flow of process fluid flows through the flow tube. The weldment is expensive to manufacture and requires a significant amount of space to be installed between the two opposed ends of the process piping.

SUMMARY

A magnetic flowmeter for measuring flow of a process fluid includes a meter body having an opening formed therein. The meter body is configured to be inserted in-line between process piping which carries the process fluid. A moveable extension is coupled to the meter body and configured to extend into the process piping. A coil of wire is carried by the extension and configured to generate a magnetic field. A pair of electrodes sense an EMF in the process fluid generated as a function of the applied magnetic field and flow of the process fluid.

BRIEF DESCRIPTION OF THE DRAWINGS

FIGS. 1A and 1B are views of an industrial process including exploded views showing a magnetic flowmeter and process piping.

DETAILED DESCRIPTION OF ILLUSTRATIVE EMBODIMENTS

In various aspects, the present invention provides a thin, disc or wafer-like configuration for a magnetic flowmeter body. The flowmeter body can be configured to be generally disc-shaped such that it can be mounted between opposed ends of process piping and require little clearance. The flowmeter body supports at least one hinged petal (or extension). The hinged petal is configured to open into the process piping and carry a coil of electrical wire which is used to generate a magnetic field in the process fluid. A pair of electrodes are used to sense a resultant Electromotive Force (EMF) due to the applied magnetic field and the flow of process fluid. Measurement circuitry can be carried on the meter body, on an extension, or can be located externally to the meter body. The measurement circuitry receives the sensed EMF and provides an output related to flow of process fluid. This configuration eliminates the "weldment" and reduces the amount of space needed to mount and align the flowmeter with the process piping. Unlike prior art designs in which an elongate flowtube is positioned in series with the process piping, the extension (s) are aligned coaxially within the process piping and extend inside of the process piping. Further, the magnetic flowmeter may be easily removed and therefore well suited in systems that require inspection or cleaning such as water and waste water management.

Figure 1A:
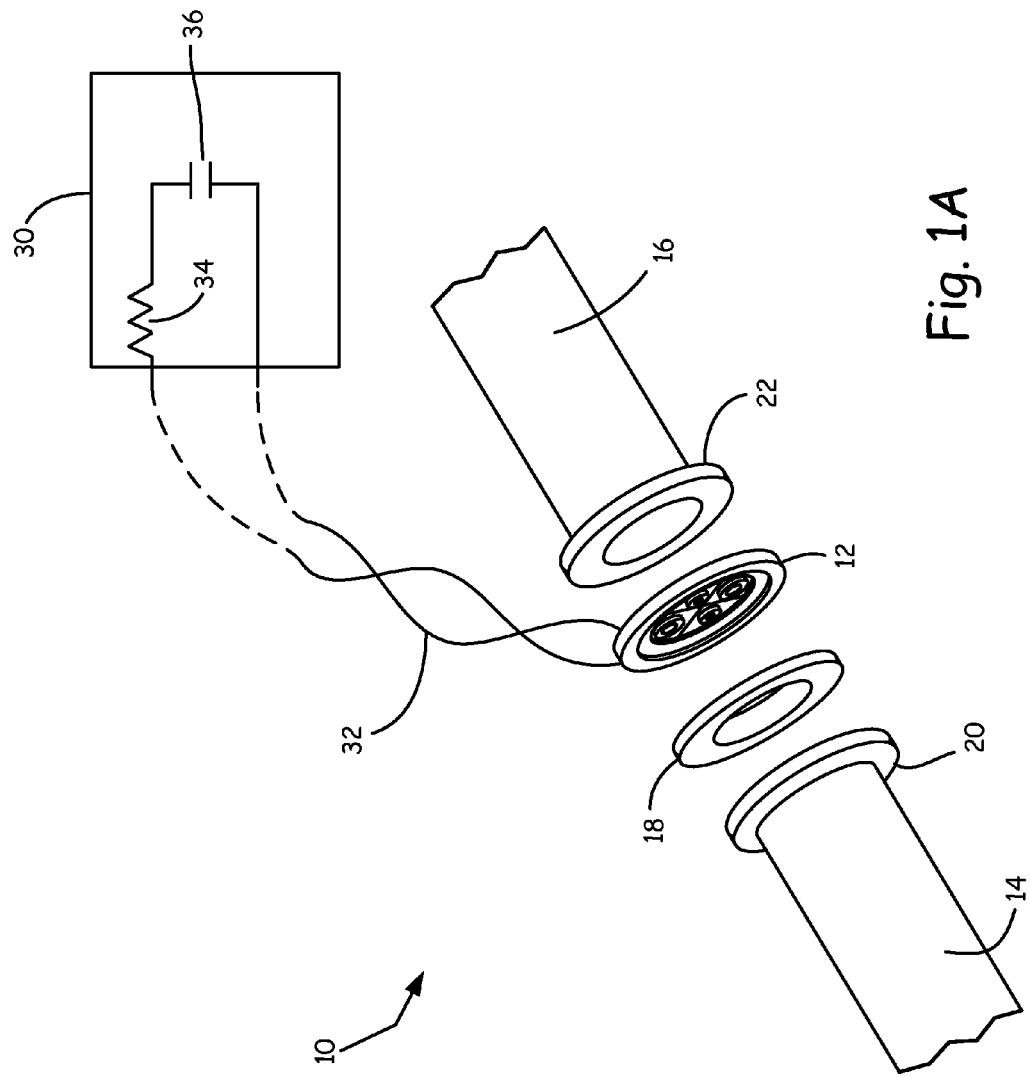

FIGS. 1A and 1B are simplified diagrams of an industrial process environment 10 showing an exploded view of a magnetic flowmeter 12 aligned with process piping 14 and 16. FIG. 1A shows a configuration in which the electronics are carried within the ring shaped body of magnetic flowmeter 12. FIG. 1B shows another example embodiment in which at least some electronics are carried in a separate housing 12A which may be physically attached to or spaced apart from the ring shaped body of magnetic flowmeter 12. A leading edge ring 18 is positioned on an upstream side of flowmeter 12. Flowmeter 12 is secured between flanges 20 and 22 of process piping 14 and 16. In one example embodiment, flowmeter 12 communicates with a remote location, such as a central control room 30 over a communication link 32. Central control room 30 is illustrated as a resistance 34 and a voltage source 36 of the type commonly used with two-wire industrial process control loops. In such control loops, the flow rate can be communicated by controlling the current flowing through current loop 32. Other example process control loops include those that carry digital information such as those in accordance with the HART® communication protocol. Other example digital communication protocols include Foundation Fieldbus and PROFIBUS. Further, loop 32 may comprise a wireless communication link in which data is communicated using RF communication techniques. One example wireless communication link is in accordance with the WirelessHART® communication protocol.

Figure 2:
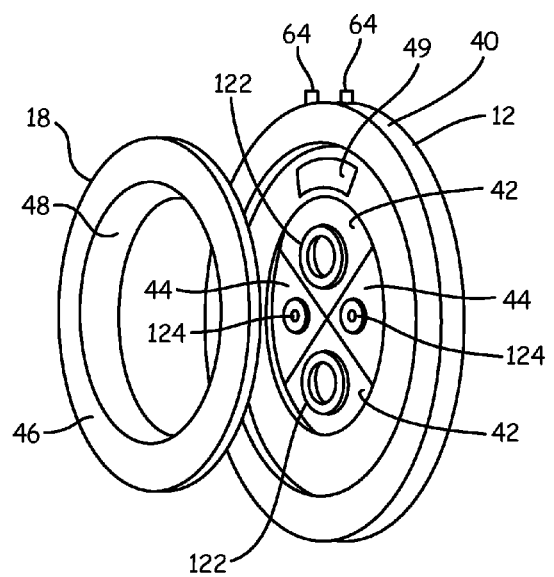
FIG. 2 is an exploded perspective view of the magnetic flowmeter and a mounting ring of FIG. 1A.
Figure 3:
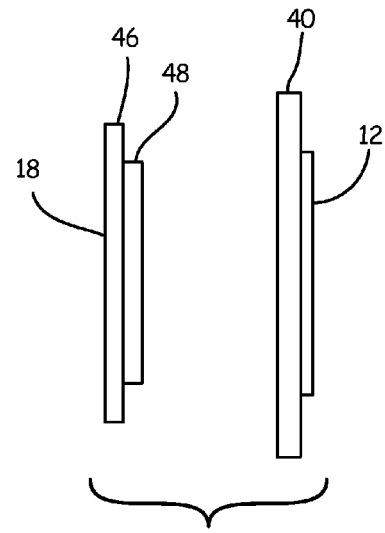
FIG. 3 is a side view of the mounting ring and magnetic flowmeter.

FIG. 2 is a front perspective view and FIG. 3 is a side plan view of one embodiment of magnetic flowmeter 12 and front edge ring 18. In FIGS. 2 and 3, the flowmeter 12 is shown in its collapsed position in which the flowmeter extensions 42, 44 are aligned with a plane with an outer mounting ring or metal body 40 of flowmeter 12. Electrical connectors 64 are provided for coupling to, for example, loop 32 or external measurement circuitry carried in housing 12A shown in FIG. 1B. Leading edge ring 18 has an outer ground ring 46 and an extension actuating ring 48. Ground ring 46 electrically contacts an electrical ground pad 49 carried on outer mounting ring 40. Extensions 42 carry electrical coils 122 and extensions 44 carry electrodes 124.

Figure 4:
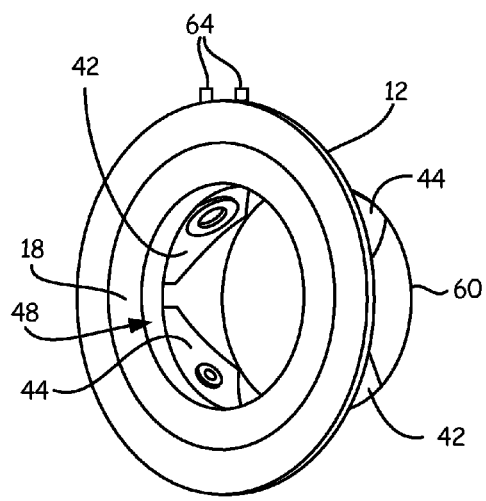
FIG. 4 is a front perspective view of the mounting ring assembled to the magnetic flowmeter.
Figure 5:
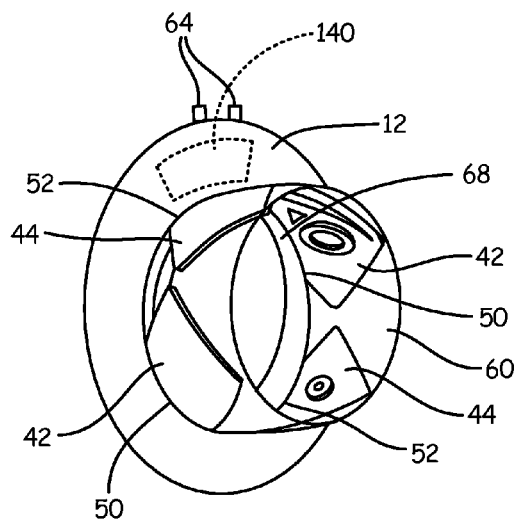
FIG. 5 is a rear perspective view of the mounting ring assembled to the magnetic flowmeter.

FIGS. 4 and 5 are front perspective and rear perspective views, respectively, of leading edge ring 18 positioned against magnetic flowmeter 12. As illustrated in FIGS. 4 and 5, extension actuating ring 48 pushes extensions 42, 44 into an open position in which they extend in a direction towards a trailing edge (or downstream edge) of magnetic flowmeter 12. The extensions 42, 44 couple to outer mounting ring 40 at hinge regions 50, 52, respectively. These can comprise, for example, living (or "live") hinges or the like. Preferably, in one example embodiment, flowmeter 12 is fabricated of a non-conductive flexible material and may be formed as a unitary piece with outer mounting ring 40 and extensions 42, 44. Leading edge ring 18 can be fabricated from metal and is configured to hold the extensions 42, 44 in an open position. Ground ring 46 electrically couples to process piping 14 or flange 20. Leading edge ring 18 acts as a lining protector to provide a smooth transition as the flow of process fluid moves through outer mounting ring 40 and past extensions 42, 44. Preferably, the extensions 42, 44 extend in a manner such that they are flush with an interior diameter of pipe 16 and bend to conform to the interior profile of pipe 16. This reduces the drag on any flow of process fluid through the piping 16 and reduces the amount of turbulence induced in the flow.

FIGS. 4 and 5 also illustrate an insulating layer 60 which is positioned around the outer circumference formed by the open extensions 42, 44. Insulating layer 60 provides a layer of insulation between the process fluid and a conductive interior wall of process piping 16. This allows an electromotive force (EMF) to be generated within the process fluid due to movement of the process fluid and an applied magnetic field. Without such insulation, the process fluid in the region of electrodes 124 may be electrically connected to ground thereby electrically shorting any generated EMF. The insulating layer 60 can be formed of a thin rubber or other flexible insulating material such that it is stretched around an outer circumference formed by the extensions 42, 44 as they are moved into the opening position shown in FIGS. 4 and 5. FIG. 5 also illustrates magnetic flowmeter circuitry 140 explained below in connection with FIG. 9 in more detail. Circuitry 140 can be overmolded within outer mounting ring 40. Electrical connections 64 are also shown which can be used to provide power to circuitry 140 and/or can be used for communication, for example of information related to a measured flow rate. Contacts 64 are electrically connected to circuitry 140 and can, for example, couple to process control loop 32 shown in FIG. 1. Contacts 64 may be configured as a plug, screw-on connector posts, etc. In some configurations, the connectors 64 are enclosed within a protective housing (not shown). Further, FIG. 5 shows an optional magnetic field strength sensor 68 such as a Hall effect sensor which couples to measurement circuitry 140 which can be used to measure the strength of the applied magnetic field as explained below in more detail. Although a Hall effect sensor is specifically discussed, any appropriate sensor may be used to sense the field strength of the applied magnetic field. In some configurations, it may be beneficial to include a magnetic return path (not shown) to strengthen the magnetic field applied by coils 122. For example, the extensions 42 may carry a magnetic shield to provide such a return path.

In one example embodiment, the magnetic flowmeter 12 is fabricated as a single piece of insulating elastomeric material such as rubber, polyurethane, EPDM (ethylene propylene diene monomer rubber), or the like. The coils 122 and the electrodes 124 can be mounted through an overmolding process during fabrication of flowmeter 12. Coils 122 can be completely sealed within the extensions 42 of flowmeter 12. However, electrodes 124 should be exposed through the extensions 44 whereby they are in electrical contact with any process fluid. For example, the electrodes 124 can have a raised portion which extends through the overmolding whereby they are in electrical contact with the process fluid. In another example, the electrodes 124 are formed of conductive patches which are positioned on an exterior surface of the extension. The circuitry used to form the coils 122 and electrodes 124 can be flexible circuitry wherein the circuitry can bend as the extensions open and curve to match the interior profile of the process piping 16. An injection molding technique can be used such that the material is molded over the flexible circuitry.

Figure 6:
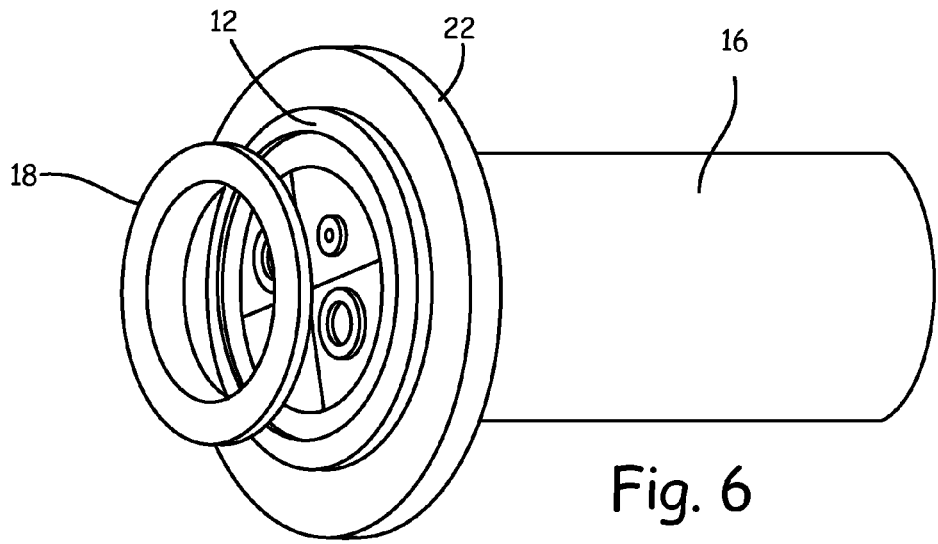
FIG. 6 is a partial exploded view showing the magnetic flowmeter mounted to process piping.
Figure 7:
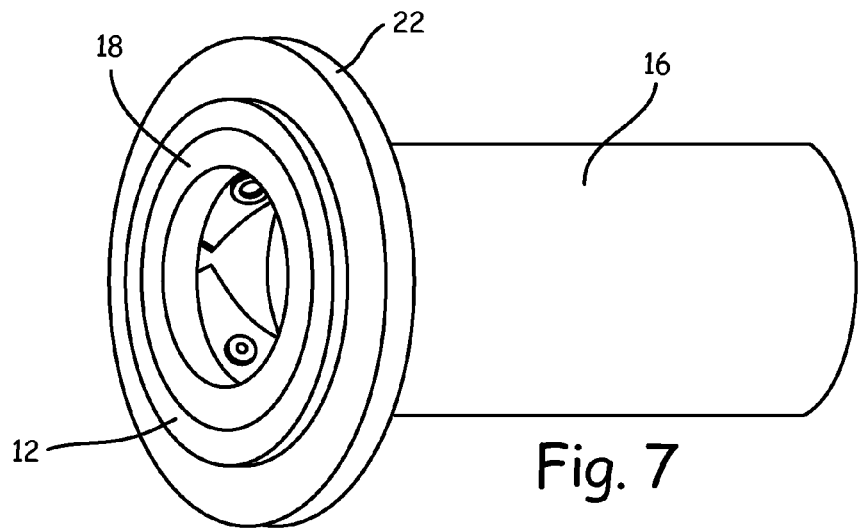
FIG. 7 is a perspective view showing the magnetic flowmeter and the mounting ring mounted to process piping.

FIGS. 6 and 7 are perspective views showing placement of magnetic flowmeter 12 onto flange 22 of pipe 16. In FIG. 6, the magnetic flowmeter 12 is positioned on flange 22 and the leading edge ring 18 is brought into alignment therewith. In FIG. 7, the leading edge ring 18 urged against extensions 42, 44 such that they open into the interior of pipe 16. Thus, extensions 42, and 44 have a diameter in the open position which is somewhat smaller than pipe 16 and extend coaxially with pipe 16. In the closed position the side profile of flowmeter 12 is relatively thin allowing it to be inserted between opposed pipe flanges with very little spacing. For example, for a four inch diameter magnetic flowmeter, only about 0.75 inches of separation between pipe flanges 20 and 22 is needed.

Figure 8:
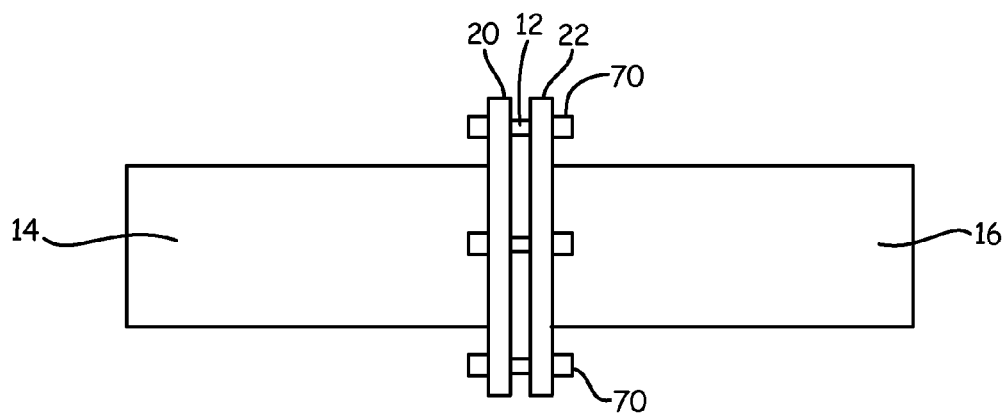
FIG. 8 is a side view showing the magnetic flowmeter and mounting ring mounted between opposed process pipes.

FIG. 8 is a side plan view showing pipes 14 and 16 which secure flowmeter 12 between respective flanges 20 and 22. In this configuration, flowmeter 12 is an electrical contact with process piping 14, 16 through the electrical connection with ground ring 46 and electrical contact 48 shown in FIG. 2. As discussed above, contact 48 is carried by outer mounting ring 40 and has an exterior surface exposed which is configured to contact the leading edge ring 18 and thereby provide an electrical connection to the electrical ground provided by process piping 14.

Figure 9:
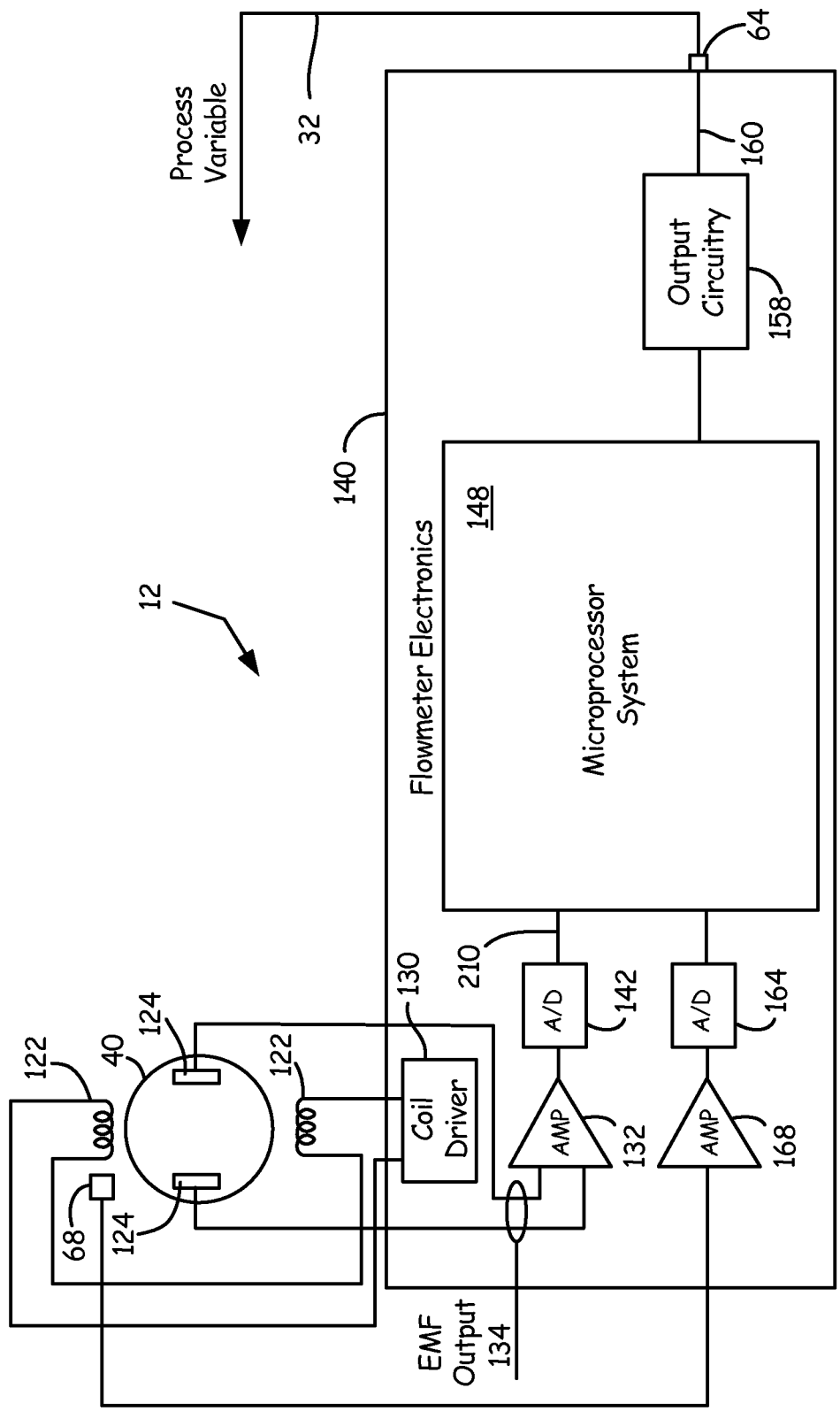
FIG. 9 is a simplified block diagram of the magnetic flowmeter.

In FIG. 9, a block diagram shows one embodiment of flowmeter circuitry 140 for measuring a flow of a conductive process fluid. Coils 122 are configured to apply a magnetic field to the fluid flow in response to an applied drive current from coil driver 130. EMF sensors (electrodes) 124 electrically couple to the fluid flow and provide an EMF signal output 134 to amplifier 132 related to an EMF generated in the fluid flow due to the applied magnetic field and fluid velocity. Analog to digital converter 142 provides a digitized EMF signal to microprocessor system 148. A microprocessor system 148 couples to the EMF output 134 and provides an output 160 related to fluid velocity.

Microprocessor system 148 calculates the fluid velocity through process piping 16 in accordance with a relationship between the EMF output 134 and the flow velocity as set forth in Faraday's law, which states:

$$V = \frac{E}{kBD} \qquad \text{Eq. 1}$$

Where E is the EMF output 134, V is the velocity of the fluid, D is the diameter between the two extensions 44 and B is the strength of the magnetic field in the fluid. K is a constant of proportionality. Output circuitry 158 generates an output 160 for transmission on loop 32 connected to connectors 64. Connectors 64 may couple to loop 32 and/or a power source to power circuitry 140.

An optional Hall Effect sensor 68 can be used to measure the strength of the magnetic field applied by coils 122. The strength of the applied magnetic field may vary due to variability in the installation conditions. For example, various types or sizes of process piping 14, 16 may alter the magnetic field. Such changes in the magnetic field will also result in a change in the measured EMF. In order to adjust for such changes the Hall Effect sensor can be used to measure the magnetic field through amplifier 168 and analog to digital converter 164. Based upon the measured magnetic field, a corrected value of the variable B in Equation 1 can be utilized in order to obtain accurate flow measurements.

Although the present invention has been described with reference to preferred embodiments, workers skilled in the art will recognize that changes may be made in form and detail without departing from the spirit and scope of the invention. The circuitry shown in FIG. 9 provides one example of measurement circuitry for measuring flow of process fluid based upon a sensed EMF. The circuitry can be embedded or mounted on or within outer mounting ring 40, extensions 42, 44, or can be positioned in a housing or the like such as a transmitter located externally to outer mounting ring 40. For example, housing 12A shown in FIG. 1B can be configured as a flow transmitter. Outer mounting ring 40 is one example embodiment of a meter body as used herein. As used herein, the term "hinge" refers to any element or component capable of allowing relative angular motion between two components. Hinges can be mechanical components in which elements slide therebetween or can be formed by a flexible element. Although four extensions are illustrated in figures, any number of extensions may be employed as desired. Although the electrodes are shown as being carried on the extensions, in other configurations the electrodes can be mounted on the outer mounting ring 40. Although specific examples of flexible insulating materials are set forth herein, any appropriate material may be used including any type of polymer material that provides electrically insulating properties.

What is claimed is:

1. A magnetic flowmeter for measuring flow of a process fluid, comprising:
    a meter body having an opening formed therein, the meter body configured to be inserted in-line between process piping which carries the process fluid;
    a moveable extension coupled to the meter body and configured to move relative to the meter body and extend into the process piping in an open position and at least partially cover the opening of the meter body in a closed position;
    a coil of wire carried on the moveable extension configured to generate a magnetic field directed into the process fluid; and
    a pair of electrodes configured to sense an EMF in the process fluid generated as a function of the magnetic field and flow of the process fluid.

2. The magnetic flowmeter of claim 1, including measurement circuitry coupled to the pair of electrodes configured to provide an output indicative of flow rate of the process fluid as a function of the sensed EMF.

3. The magnetic flowmeter of claim 2, wherein the measurement circuitry is carried in the meter body.

4. The magnetic flowmeter of claim 2, wherein the measurement circuitry is carried externally to the meter body.

5. The magnetic flowmeter of claim 2, wherein the measuring circuitry is located externally to the meter body and further including electrical connectors carried on the meter body configured to couple to the measurement circuitry.

6. The magnetic flowmeter of claim 1, wherein the moveable extension is coupled to the meter body by a hinge.

7. The magnetic flowmeter of claim 6, wherein the hinge allows the moveable extension to move from a flat position which is parallel with a plane of the meter body to an extended position which extends into the process piping.

8. The magnetic flowmeter of claim 1, including a plurality of moveable extensions.

9. The magnetic flowmeter of claim 1, wherein at least one of the pair of electrodes is carried on the moveable extension.

10. The magnetic flowmeter of claim 1, wherein at least one of the pair of electrodes is carried by the meter body.

11. The magnetic flowmeter of claim 1, including a leading edge ring configured to be sandwiched between the meter body and a flange of the process piping.

12. The magnetic flowmeter of claim 11, wherein the leading edge ring is positioned upstream of the meter body.

13. The magnetic flowmeter of claim 11, wherein the leading edge ring is configured to urge the moveable extension to extend into the process piping.

14. The magnetic flowmeter of claim 11, wherein the leading edge ring comprises a metal and is configured to provide an electrical connection to the process piping.

15. The magnetic flowmeter of claim 1, wherein the moveable extension comprises a flexible insulating material.

16. The magnetic flowmeter of claim 15, wherein the flexible insulating material comprises a polymer.

17. The magnetic flowmeter of claim 1, including electrical connectors carried on the meter body configured to couple to a process control loop.

18. The magnetic flowmeter of claim 1, including electrical connectors carried on the meter body configured to couple the coil of wire to an external power supply.

19. The magnetic flowmeter of claim 1, including a second coil of wire carried on a second moveable extension.

20. The magnetic flowmeter of claim 1, including a second moveable extension and wherein the pair of electrodes are carried on the moveable extensions.

21. The magnetic flowmeter of claim 1, including an insulating layer which separates the moveable extension from the process piping.

22. The magnetic flowmeter of claim 1, including a magnetic field strength sensor arranged to sense the magnetic field strength of the agnetic field.

23. The magnetic flowmeter of claim 1, wherein the moveable extension is formed by a plurality of collapsible petals.

24. The magnetic flowmeter of claim 23, including an insulating layer which extends between the plurality of collapsible petals.

25. A method of coupling a magnetic flowmeter to process piping and measuring flow of a process fluid, comprising:
    placing a meter body between two opposed process pipes which carry the process fluid;
    mounting the meter body between the two process pipes and thereby causing a moveable extension carried by the meter body to move relative to the meter body from a closed position which at least partially covers an opening of the meter body to an open position and extend into the process piping;
    applying a magnetic field to process fluid carried in the process piping generated by a coil of wire carried by the moveable extension; and
    sensing an electromotive force in the process fluid which is a function of the magnetic field and flow of the process fluid.

26. The method of claim 25, wherein the moveable extension is coupled to the meter body by a hinge.

27. The method of claim 25, including moving the moveable extension from a flat position which is parallel with a plane of the meter body to an extended position which extends into the process piping.

28. The method of claim 25, including sandwiching a leading edge ring between the meter body and a process piping.

29. The method of claim 25, including measuring a strength of the magnetic field generated by the coil of wire and compensating flow measurements based upon the measured strength of the magnetic field.

30. The method of claim 25 wherein the moveable extension is flexible.

* * * * *

UNITED STATES PATENT AND TRADEMARK OFFICE
CERTIFICATE OF CORRECTION

PATENT NO. : 9,222,815 B2
APPLICATION NO. : 14/143718
DATED : December 29, 2015
INVENTOR(S) : Joseph Alan Smith et al.

Page 1 of 1

It is certified that error appears in the above-identified patent and that said Letters Patent is hereby corrected as shown below:

Claims

Claim 22: Column 6, line 36, delete "agnetic" and insert --magnetic--

Signed and Sealed this
Thirty-first Day of May, 2016

Michelle K. Lee
*Director of the United States Patent and Trademark Office*